(12) United States Patent
Higaki

(10) Patent No.: US 9,315,662 B2
(45) Date of Patent: Apr. 19, 2016

(54) RESIN COMPOSITION FOR DIRECT METAL PLATING, MOLDED ARTICLE, AND METAL-PLATED MOLDED ARTICLE

(75) Inventor: Keigo Higaki, Tokyo (JP)

(73) Assignee: Techno Polymer Co., Ltd., Tokyo (JP)

( * ) Notice: Subject to any disclaimer, the term of this patent is extended or adjusted under 35 U.S.C. 154(b) by 793 days.

(21) Appl. No.: 12/093,468

(22) PCT Filed: Nov. 20, 2006

(86) PCT No.: PCT/JP2006/323128
§ 371 (c)(1),
(2), (4) Date: May 13, 2008

(87) PCT Pub. No.: WO2007/063732
PCT Pub. Date: Jun. 7, 2007

(65) Prior Publication Data
US 2009/0226727 A1    Sep. 10, 2009

(30) Foreign Application Priority Data

Nov. 30, 2005  (JP) ................................ 2005-346506

(51) Int. Cl.
| | | |
|---|---|---|
| C08L 55/02 | (2006.01) | |
| C08L 69/00 | (2006.01) | |
| C25D 5/56 | (2006.01) | |
| C08L 23/08 | (2006.01) | |
| C08L 23/16 | (2006.01) | |
| C08L 23/18 | (2006.01) | |
| C08L 25/12 | (2006.01) | |
| C08L 51/04 | (2006.01) | |

(52) U.S. Cl.
CPC ................ C08L 55/02 (2013.01); C08L 69/00 (2013.01); C25D 5/56 (2013.01); *C08L 23/0815* (2013.01); *C08L 23/16* (2013.01); *C08L 23/18* (2013.01); *C08L 25/12* (2013.01); *C08L 51/04* (2013.01); *C08L 2205/02* (2013.01); *C08L 2205/03* (2013.01); *Y10T 428/31507* (2015.04); *Y10T 428/31692* (2015.04)

(58) Field of Classification Search
CPC ..... C08L 23/16; C08L 55/02; C08L 2666/24; C08L 23/0815; C08L 23/18; C08L 25/12; C08L 51/04; C08L 69/00; C08L 2205/02; C08L 2205/03; C08L 2666/02; C25D 5/56
USPC ..................... 428/412, 461, 521, 522; 525/70
See application file for complete search history.

(56) References Cited

FOREIGN PATENT DOCUMENTS

| | | | | |
|---|---|---|---|---|
| JP | 7 11487 | 1/1995 | | |
| JP | 11 61425 | 3/1999 | | |
| JP | 11 181218 | 7/1999 | | |
| JP | 2000 17138 | 1/2000 | | |
| JP | 2000 34321 | 2/2000 | | |
| JP | 2000119477 A | * 4/2000 | ............. | C08L 51/04 |
| JP | 2002 338636 | 11/2002 | | |
| JP | 2003 327817 | 11/2003 | | |
| JP | 2006 299089 | 11/2006 | | |
| JP | 2006 328133 | 12/2006 | | |
| JP | 2006 328134 | 12/2006 | | |

OTHER PUBLICATIONS

Derwent abstract Accession No. 2000-109000 for JP 2000-119477, Matsuzaka et al., Apr. 25, 2000.*
Machine translation of JP 2000-119477, Matsuzaka et al., (2000).*
Office Action issued on Mar. 28, 2013 in the counterpart Korean Application No. 10-2008-7015837 (with English Translation).
European Office Action issued Aug. 1, 2011 in connection with corresponding European Application No. 06 832 978.8, filed Nov. 20, 2006.
Office Action issued Nov. 22, 2011 in Japanese Patent Application No. 2006-313430 (with English translation).

* cited by examiner

*Primary Examiner* — Callie Shosho
*Assistant Examiner* — John Freeman
(74) *Attorney, Agent, or Firm* — Oblon, McClelland, Maier & Neustadt, L.L.P.

(57) ABSTRACT

The objective of the present invention is to provide a resin composition for direct plating whose plating performance such as depositibility and appearance after forming a metal film including copper film and the like by electroplating in direct plating method is excellent, a molded article comprising this composition, and a plated article having a metal film or an alloy film, formed by direct plating. The present composition is a thermoplastic resin composition containing a rubber-reinforced vinyl-based resin and the rubber-reinforced vinyl-based resin comprises a diene-based rubbery polymer [a1] and an ethylene•α-olefin-based rubbery polymer [a2], the total amount of the diene-based rubbery polymer [a1] and the ethylene•α-olefin-based rubbery polymer [a2] is from 3 to 30% by mass based on the thermoplastic resin composition, and the ratio of the ethylene•α-olefin-based rubbery polymer [a2] to the total amount is from 0.01 to 0.4.

8 Claims, No Drawings

RESIN COMPOSITION FOR DIRECT METAL PLATING, MOLDED ARTICLE, AND METAL-PLATED MOLDED ARTICLE

TECHNICAL FIELD

The present invention relates to a resin composition for direct plating, a molded article and a plated article. More particularly, the present invention relates to a resin composition for direct plating whose plating performance such as depositibility and appearance after forming a metal film including copper film and the like or an alloy film by electroplating in direct plating method is excellent, a molded article comprising this composition, and a plated article having a metal film or an alloy film, formed by direct plating method.

BACKGROUND ART

Conventionally, ABS resin or PC/ABS resin is mainly used as a thermoplastic resin suited to plating from the aspect of being excellent moldability, impact resistance and the like. And, a plated resin product obtained by applying direct plating method excellent in safety, workability and the like to a molded article composed of these resins or resin compositions, and a resin composition suitable for such a molded article have been investigated (cf. JP-A 2002-338636, JP-A 2003-327817).

A main method for plating onto a resin molded article is one including attaching a catalyst on a surface of the molded article, treating the surface with a dilute acid solution, being subject to electroless copper plating or electroless nickel plating to form a conductive layer, and forming a metal film or an alloy film on it by electroplating.

However, formaldehyde which is used as a reducing agent, being toxic is widely formulated in a solution for electroless copper plating and health problem to workers is indicated. Additionally, since this solution sometimes contain a complexing agent such as EDTA which is strongly functioning in order to make copper ion solubilize in an alkali solution, too much labor for eliminating metal ions in drainage treatment (a process including filtration->treatment with activated carbon->ion exchanging and the like is necessary) is required, causing many problems.

Further, a solution for electroless nickel plating contains a phosphinate as a reducing agent, and when the solution is used, this phosphinate may be oxidized to generate a phosphite that is in controlled substances, being problem. In addition, this drainage after plating is a high COD solution and is presently an environmental pollutant.

Considering occupational health and safety and global environment, direct plating method including no electroless plating step as a method for plating onto a resin molded article is proposed and practical application is studied. Specific example of direct plating includes a Pd—Sn colloid catalystic method that is disclosed in JP-A H7-11487, JP-A H11-61425 and the like.

DISCLOSURE OF THE INVENTION

Problems to be Solved by the Invention

The above-mentioned resin compositions disclosed in JP-A 2002-338636 and JP-A 2003-327817 are prepared with ABS resin containing a graft copolymer obtained by using a rubbery polymer having a specific particle diameter or PC/ABS resin containing a polycarbonate and the above-mentioned ABS resin, and an improvement in growability of electrolytic copper plating is exhibited. The objective of the present invention is to provide a resin composition for direct plating which contains a resin obtained by other method excellent in production stability without specifying the particle diameter of a rubbery polymer, leads to an excellent plating performance such as depositibility and appearance after forming a metal film including copper film and the like by electroplating in direct plating method, a molded article comprising this composition, and a plated article having a metal film or an alloy film, formed by direct plating method.

Means for Solving Problems

The present inventors studied in order to attain the above-mentioned objective, and it was found that, as a result, a resin composition comprising ABS resin obtained by polymerizing a vinyl-based monomer in the presence of a diene-based rubbery polymer and/or PC/ABS resin, and a specific resin, that is to say, AES resin obtained by polymerizing a vinyl-based monomer in the presence of an ethylene•α-olefin-based rubbery polymer led to an excellent plating performance. And the present invention has been accomplished.

That is, a summary of the present invention is as follows.
1. A resin composition for direct plating, which is a thermoplastic resin composition containing a rubber-reinforced vinyl-based resin, being characterized in that the above-mentioned rubber-reinforced vinyl-based resin comprises a diene-based rubbery polymer [a1] and an ethylene•α-olefin-based rubbery polymer [a2], that the total amount of the above-mentioned diene-based rubbery polymer [a1] and the above-mentioned ethylene•α-olefin-based rubbery polymer [a2] is 3 to 30% by mass based on the above-mentioned thermoplastic resin composition, and that the ratio of the above-mentioned ethylene•α-olefin-based rubbery polymer [a2] to the above-mentioned total amount is 0.01 to 0.4.
2. The resin composition for direct plating according to 1 above, wherein the rubber-reinforced vinyl-based resin comprises a mixture consisting of a rubber-reinforced vinyl-based resin [A1] obtained by polymerizing a vinyl-based monomer [b1] in the presence of the diene-based rubbery polymer [a1] and a rubber-reinforced vinyl based resin [A2] obtained by polymerizing a vinyl-based monomer [b2] in the presence of the ethylene•α-olefin-based rubbery polymer [a2], or a mixture consisting of the rubber-reinforced vinyl-based resin [A1], the rubber-reinforced vinyl based resin [A2] and a (co)polymer of a vinyl-based monomer [b3].
3. The resin composition for direct plating according to 1 above, wherein the composition further comprises a polycarbonate resin and the content of the polycarbonate resin is from 35 to 90% by mass with respect to 100% by mass of the total of the polycarbonate and the rubber-reinforced vinyl-based resin.
4. A molded article being characterized by comprising the resin composition for direct plating according to 1 above.
5. The molded article according to 4 above, wherein the resin composition for direct plating further comprises a polycarbonate resin and the content of the polycarbonate resin is from 35 to 90% by mass with respect to 100% by mass of the total of the polycarbonate and the rubber-reinforced vinyl-based resin.
6. A plated article being characterized by comprising a molded part comprising the resin composition for direct plating according to 1 above, and a film comprising a metal or an alloy, which is formed on at least one part of surface of the molded part by direct plating.

7. The plated article according to 6 above, wherein the resin composition for direct plating further comprises a polycarbonate resin and the content of the polycarbonate resin is from 35 to 90% by mass with respect to 100% by mass of the total of the polycarbonate and the rubber-reinforced vinyl-based resin.

Effects of the Invention

According to the resin composition for direct plating of the present invention, a molded article excellent in plating performance such as depositibility and appearance after forming a metal film including copper film and the like or an alloy film by electroplating in direct plating method can be obtained.

Additionally, in the case the present resin composition for direct plating further comprises a polycarbonate resin in a specific amount, impact resistance is excellent in particular.

According to the molded article of the present invention, plating performance such as depositibility and appearance after forming a metal film including copper film and the like or an alloy film by electroplating in direct plating method is superior.

According to the plated article of the present invention, adherence and appearance of a metal film or an alloy film are superior. Further, since direct plating method is applied, the obtained plated article has no toxic substances such as formaldehyde using as a reducing agent in electroless plating method.

BEST MODE FOR CARRYING OUT THE INVENTION

The invention is described in further detail.
1. Resin Composition for Direct Plating The resin composition for direct plating of the present invention (hereinafter, referred to as "the present composition") is a thermoplastic resin composition containing a rubber-reinforced vinyl-based resin, and is characterized in that the above-mentioned rubber-reinforced vinyl-based resin comprises a diene-based rubbery polymer [a1] and an ethylene•α-olefin-based rubbery polymer [a2], that the total amount of the above-mentioned diene-based rubbery polymer [a1] and the above-mentioned ethylene•α-olefin-based rubbery polymer [a2] is in a range from 3 to 30% by mass with respect to the above-mentioned thermoplastic resin composition, and that the ratio of the above-mentioned ethylene•α-olefin-based rubbery polymer [a2] to the above-mentioned total amount is in a range from 0.01 to 0.4. In this specification, "(co)polymer(ize)" means homopolymer(ize) and copolymer(ize), and "(meth)acryl" means acryl and methacryl.

Examples of the diene-based rubbery polymer [a1] and the ethylene•α-olefin-based rubbery polymer [a2] contained in the above-mentioned rubber-reinforced vinyl-based resin are as follows.

The diene-based rubbery polymer [a1] includes a homopolymer such as polybutadiene and polyisoprene; a styrene•butadiene-based copolymer such as styrene•butadiene copolymer, styrene•butadiene•styrene copolymer and acrylonitrile•styrene•butadiene copolymer; a styrene•isoprene-based copolymer such as styrene•isoprene copolymer, styrene•isoprene•styrene copolymer and acrylonitrile•isoprene•butadiene copolymer, and the like. These may be used alone or in combination of two or more.

The ethylene•α-olefin-based rubbery polymer [a2] includes an ethylene•α-olefin copolymer such as ethylene•propylene copolymer and ethylene•butene-1 copolymer; an ethylene•α-olefin•non-conjugated diene copolymer such as ethylene•propylene•5-ethylidene-2-norbornen copolymer and ethylene•butene•5-ethylidene-2-norbornen copolymer, and the like. These may be used alone or in combination of two or more. It is noted that this ethylene•α-olefin-based rubbery polymer [a2] includes a polymer where a block (co)polymer obtained by using a conjugated diene compound such as butadiene and isoprene is hydrogenated (Hydrogenation rate of a double bond in a conjugated diene portion is preferably 90% or more.).

Each of the above-mentioned polymers may be a crosslinked polymer or a non-crosslinked polymer.

The above-mentioned rubber-reinforced vinyl-based resin is a polymer component containing the diene-based rubbery polymer [a1] and the ethylene•α-olefin-based rubbery polymer [a2], however, the way of containing them is not limited in particular.

The above-mentioned rubber-reinforced vinyl-based resin contains a resin obtained by polymerizing a vinyl-based monomer in the presence of a rubbery polymer, and the rubber-reinforced vinyl-based resin contained in the present composition may be the above-mentioned resin, or may be a resin consisting of the above-mentioned resin and other polymer comprising a monomer unit formed from a vinyl-based monomer. When the vinyl-based monomer is polymerized in the presence of the rubbery polymer, a grafted rubbery polymer in which the entire vinyl-based monomer is graft-copolymerized to the rubbery polymer, or a mixture containing a grafted rubbery polymer in which a part of the vinyl-based monomer is graft-copolymerized to the rubbery polymer, and a (co)polymer of the rest vinyl-based monomer, which is not grafted to the rubbery polymer, is obtained.

Therefore, the way of containing the above-mentioned diene-based rubbery polymer [a1] and ethylene•α-olefin-based rubbery polymer [a2] is exemplified as below.
(1) A case where both the diene-based rubbery polymer [a1] and the ethylene•α-olefin-based rubbery polymer [a2] are contained as grafted rubbery polymers, respectively.
(2) A case where either the diene-based rubbery polymer [a1] or the ethylene•α-olefin-based rubbery polymer [a2] is contained as a grafted rubbery polymer, and the other is contained as a non-grafted rubbery polymer.
(3) A case where both the diene-based rubbery polymer [a1] and the ethylene•α-olefin-based rubbery polymer [a2] are contained as non-grafted rubbery polymers.

The case (1) is particularly preferred among these.

The rubber-reinforced vinyl-based resin according to the above case (1) is exemplified as below.
[i] A mixture of a rubber-reinforced vinyl-based resin [A1] obtained by polymerizing a vinyl-based monomer [b1] in the presence of the above-mentioned diene-based rubbery polymer [a1] and a rubber-reinforced vinyl based resin [A2] obtained by polymerizing a vinyl-based monomer [b2] in the presence of the above-mentioned ethylene•α-olefin-based rubbery polymer [a2].
[ii] A mixture of the above-mentioned mixture [i] and a (co)polymer of a vinyl-based monomer [b3] (hereinafter, referred to as "polymer [B]").
[iii] A rubber-reinforced vinyl-based resin [A3] obtained by polymerizing a vinyl-based monomer [b1] in the presence of the above-mentioned diene-based rubbery polymer [a1] and the above-mentioned ethylene•α-olefin-based rubbery polymer [a2].
[iv] A mixture of the above-mentioned rubber-reinforced vinyl-based resin [A3] and the above-mentioned polymer [B].

Among these, modes [i] and [ii] are particularly preferred.

The above-mentioned rubber-reinforced vinyl-based resin may be one where two or more modes among [i], [ii], [iii] and [iv] are combined. Further, two or more kinds in each of the mode [i], [ii], [iii] or [iv] may be combined.

The above-mentioned vinyl-based monomer [b1], [b2] and [b3] are not particularly limited so long as each of them is a polymerizable compound having an unsaturated bond.

The above-mentioned vinyl-based monomer [b1] and [b2] usually contain an aromatic vinyl compound and a cyanidated vinyl compound. Further, a (meth)acrylic acid ester, a maleimide compound, a polymerizable compound having one or more functional groups such as a carboxyl group, an acid anhydride group, a hydroxyl group, an amino group, an amide group, an epoxy group and an oxazoline group, and the like as other monomers may be used together if necessary. The vinyl-based monomers [b1] and [b2] used for forming the above-mentioned rubber-reinforced vinyl-based resins [A1] and [A2] may be the same or different from each other.

In addition, the polymer [B] in the above-mentioned [ii] and [iv] is a homopolymer obtained by polymerizing one or more vinyl-based monomer [b3] selected from the group consisting of an aromatic vinyl compound, a cyanidated vinyl compound a (meth)acrylic acid ester, a maleimide compound and a polymerizable compound having one or more functional group such as a carboxyl group, an acid anhydride group, a hydroxyl group, an amino group, an amide group, an epoxy group and an oxazoline group, or a copolymer.

The above-mentioned aromatic vinyl compound is not particularly limited so long as it is a compound having at least one vinyl bond and at least one aromatic ring. The example includes styrene, α-methyl styrene, o-methyl styrene, p-methyl styrene, vinyl toluene, β-methyl styrene, ethyl styrene, p-tert-butyl styrene, vinyl xylene, vinyl naphthalene, monochlorostyrene, dichlorostyrene, monobromostyrene, dibromostyrene, monofluorostyrene and the like. These may be used alone or in combination of two or more. In addition, styrene and α-methyl styrene are preferred among these.

The above-mentioned cyanidated vinyl compound includes acrylonitrile, methacrylonitrile and the like. These may be used alone or in combination of two or more. In addition, acrylonitrile is preferred among these.

The above-mentioned (meth)acrylic acid ester includes an acrylic acid ester such as methyl acrylate, ethyl acrylate, propyl acrylate, butyl acrylate, amyl acrylate, hexyl acrylate, octyl acrylate, 2-ethylhexyl acrylate, cyclohexyl acrylate, phenyl acrylate and benzyl acrylate; a methacrylic acid ester such as methyl methacrylate, ethyl methacrylate, propyl methacrylate, butyl methacrylate, amyl methacrylate, hexyl methacrylate, octyl methacrylate, 2-ethylhexyl methacrylate, dodecyl methacrylate, octadecyl methacrylate, cyclohexyl methacrylate, phenyl methacrylate and benzyl methacrylate. These may be used alone or in combination of two or more. In addition, methyl methacrylate is preferred among these.

The above-mentioned maleimide compound includes maleimide, N-methyl maleimide, N-butyl maleimide, N-cyclohexyl maleimide, N-phenyl maleimide and the like. These may be used alone or in combination of two or more. In addition, N-cyclohexyl maleimide and N-phenyl maleimide are preferred among these. Introduction of the monomer unit of a maleimide compound into a polymer can be applied to an imidization after copolymerization with maleic anhydride.

The unsaturated compound having a carboxyl group among the above-mentioned polymerizable compound having a functional group includes acrylic acid, methacrylic acid, ethacrylic acid, maleic acid, fumaric acid, itaconic acid, crotonic acid, cinnamic acid and the like. These may be used alone or in combination of two or more.

The unsaturated compound having an acid anhydride group includes maleic anhydride, itaconic anhydride, citraconic anhydride and the like. These may be used alone or in combination of two or more.

The unsaturated compound having a hydroxyl group includes hydroxystyrene, 3-hydroxy-1-propene, 4-hydroxy-1-butene, cis-4-hydroxy-2-butene, trans-4-hydroxy-2-butene, 3-hydroxy-2-methyl-1-propene, 2-hydroxyethyl acrylate, 2-hydroxyethyl methacrylate, N-(4-hydroxyphenyl)maleimide and the like. These may be used alone or in combination of two or more.

The unsaturated compound having an amino group includes aminoethyl acrylate, propylaminoethyl acrylate, dimethylaminomethyl acrylate, diethylaminomethyl acrylate, 2-dimethylaminoethyl acrylate, aminoethyl methacrylate, propylaminoethyl methacrylate, dimethylaminomethyl methacrylate, diethylaminomethyl methacrylate, 2-dimethylaminoethyl methacrylate, phenylaminoethyl methacrylate, p-aminostyrene, N-vinyl diethylamine, N-acetyl vinyl amine, acrylamine, methacrylamine, N-methyl acrylamine and the like. These may be used alone or in combination of two or more.

The unsaturated compound having an amide group includes acrylamide, N-methyl acrylamide, methacrylamide, N-methyl methacrylamide and the like. These may be used alone or in combination of two or more.

The unsaturated compound having an epoxy group includes glycidyl acrylate, glycidyl methacrylate, allyl glycidyl ether and the like. These may be used alone or in combination of two or more.

The unsaturated compound having an oxazoline group includes vinyl oxazoline and the like. These may be used alone or in combination of two or more.

Next, the production methods of the above-mentioned rubber-reinforced vinyl-based resin [A1], [A2] and [A3] are described.

The production method includes emulsion polymerization, solution polymerization, suspension polymerization, bulk polymerization and the like. In all methods, the reaction may be conducted by charging all of the vinyl-based monomer [b1] or [b2] at once in the presence of the whole amount of the rubbery polymer, or by charging the vinyl-based monomer [b1] or [b2], dividedly or successively. Alternatively, the reaction may be conducted by adding the whole amount or a part of the rubbery polymer in the middle of the polymerization of the vinyl-based monomer [b1] or [b2].

With regard to the amounts to be used of the rubbery polymer, the vinyl-based monomer [b1] and [b2], the amount of the rubbery polymer is preferably in a range from 5 to 80% by mass and more preferably from 10 to 70% by mass when the total amount of the rubbery polymer and the vinyl-based monomers [b1] or [b2] is assumed to be 100% by mass. Further, the proportion of the aromatic vinyl compound and the cyanidated vinyl compound in the vinyl-based monomer [b1] and [b2] is preferably 50 to 95% by mass and 5 to 50% by mass, and more preferably from 55 to 90% by mass and from 10 to 45% by mass, respectively, when the total amount of these is assumed to be 100% by mass.

The production method of the above-mentioned rubber-reinforced vinyl-based resin [A1] is preferably emulsion polymerization. The production method of the rubber-reinforced vinyl-based resin [A2] is preferably solution polymerization and bulk polymerization, more preferably solution polymerization. And the rubber-reinforced vinyl-based resin [A3] is preferably emulsion polymerization and solution polymerization.

In the case the above-mentioned rubber-reinforced vinyl-based resins [A1], [A2] and [A3] are produced by way of emulsion polymerization, a polymerization initiator, a chain-transfer agent, an emulsifier, water and the like are usually used. In the case the above-mentioned rubbery polymer is not latex-like, that is, it is solid, re-emulsification is conducted to use as a latex-like.

The polymerization initiator includes a redox-type initiator by combining an organic peroxide such as cumene hydroperoxide, diisopropylbenzene hydroperoxide and p-menthane hydroperoxide, and a reducing agent such as sugar-containing pyrophosphoric acid formulation and sulfoxylate formulation; a persulfate such as potassium persulfate; a peroxide such as benzoyl peroxide (BPO), lauroyl peroxide, tert-butyl peroxylaurate and tert-butylperoxy monocarbonate; an azo-based polymerization initiator such as 2,2'-azobis(isobutyronitrile), and the like. The above-mentioned polymerization initiator is used usually in an amount from 0.05 to 5% by mass and preferably from 0.1 to 1% by mass with respect to the total amount of the above-mentioned vinyl-based monomer [b1] or [b2].

The above-mentioned polymerization initiator is added into the reaction system all at once or continuously.

The chain-transfer agent includes a mercaptan such as octyl mercaptan, n-dodecyl mercaptan, tert-dodecyl mercaptan, n-hexyl mercaptan, n-hexadecyl mercaptan, n-tetradecyl mercaptan and tert-tetradecyl mercaptan; a terpinolene, α-methyl styrene dimer, tetraethylthiuram sulfide, acrolein, methacrolein, allyl alcohol, 2-ethylhexyl thioglycol and the like. These may be used alone or in combination of two or more. The above-mentioned chain-transfer agent is used usually in an amount from 0.05 to 2% by mass with respect to the total amount of the above-mentioned vinyl-based monomer [b1] or [b2].

The emulsifier includes an anionic surfactant and a nonionic surfactant. Example of the anionic surfactant includes a sulfuric acid ester of a higher alcohol; an alkylbenzene sulfonate such as sodium dodecylbenzene sulfonate; an aliphatic sulfonate such as sodium lauryl sulfonate; a rosinate; a phosphate and the like. Example of the nonionic surfactant includes an alkylester compound or an alkylether of polyethylene glycol, and the like. These may be used alone or in combination of two or more. The above-mentioned emulsifier is used usually in an amount from 0.3 to 5% by mass with respect to the total amount of the above-mentioned vinyl-based monomer [b1] or [b2].

The emulsion polymerization may be carried out under publicly known conditions considering types of the vinyl-based monomer [b1] or [b2], the polymerization initiator or the like to be used. A latex obtained by this emulsion polymerization is usually subjected to solidification with a coagulant, the polymer component is pulverized, and then the product is purified by rinsing and drying. The coagulant includes an inorganic salt such as calcium chloride, magnesium sulfate, magnesium chloride and sodium chloride; an inorganic acid such as sulfuric acid and hydrochloric acid; an organic acid such as acetic acid and lactic acid, and the like. In addition, neutralization using an alkaline component or an acidic component may be conducted after solidification depending on performances required, and then rinsing may also be conducted.

When the above-mentioned rubber-reinforced vinyl-based resins [A1], [A2] and [A3] are produced by solution polymerization, a solvent, a polymerization initiator, a chain-transfer agent and the like are usually used.

The solvent may be an inactive solvent for polymerization used in publicly known radical polymerization, and includes an aromatic hydrocarbon such as ethylbenzene and toluene; a ketone such as methylethylketone and acetone; a halogenated hydrocarbon such as dichloromethylene and carbon tetrachloride; acetonitrile, dimethylformamide, N-methylpyrrolidone and the like.

The polymerization initiator includes an organic peroxide such as a ketone peroxide, a dialkyl peroxide, a diacyl peroxide, a peroxy ester and a hydroperoxide.

The chain-transfer agent includes a mercaptan, a terpinolene, α-methyl styrene dimer and the like.

The solution polymerization may be carried out under publicly known conditions considering types of the vinyl-based monomer [b1] or [b2], the polymerization initiator or the like to be used. Polymerization temperature is preferably in a range from 80° C. to 140° C. In the solution polymerization, production may be carried out using no polymerization initiators.

Also in manufacture based on the bulk polymerization and the suspension polymerization, publicly known methods can be applied. The polymerization initiator, the chain-transfer agent and the like used in these method may be the same compounds exemplified in the solution polymerization.

The graft ratio of each of the rubber-reinforced vinyl-based resin [A1], [A2] and [A3] is preferably in a range from 10 to 150%, and more preferably from 30 to 110%. When the graft ratio is less than 10% by mass, adhesive strength in the interface between a rubbery polymer and a copolymer of the vinyl-based monomer [b1] or [b2] is inferior, and impact resistance is sometimes not sufficient. On the other hand, when the graft ration is exceeding 150% by mass, a rubber elasticity may be deteriorated since a layer consisting of a copolymer of the vinyl-based monomer [b1] or [b2] on the surface of the rubbery polymer becomes thick, and a layer consisting of a grafted (co)polymer grows inside of the rubbery polymer, and impact resistance may also be deteriorated.

Here, the graft ratio refers to a value obtained by the following equation (1).

$$\text{Graft ratio (\% by mass)} = \{(S-T)/T\} \times 100 \tag{1}$$

In the equation (1), S represents the mass (gram) of an insoluble component obtained by putting 1 gram of a manufactured rubber-reinforced vinyl-based resin into 20 ml of acetone, shaking the mixture with a shaker for 2 hours, and then centrifuging the mixture with a centrifugal separator (revolution speed: 23,000 rpm) for 1 hour to separate an insoluble component and a soluble component, and T represents the mass (gram) of a rubbery polymer contained in 1 gram of the rubber-reinforced vinyl-based resin.

The intrinsic viscosity $[\eta]$ (measured in methylethylketone at a temperature of 30° C.) of the each component dissolved by acetone in the above-mentioned rubber-reinforced vinyl-based resins [A1], [A2] and [A3] is preferably in a range from 0.1 to 0.7 dl/g and more preferably from 0.2 to 0.6 dl/g. When the intrinsic viscosity $[\eta]$ is in the above-mentioned range, moldability and impact resistance are excellent.

The above-mentioned graft ratio and intrinsic viscosity $[\eta]$ can be easily controlled by changing types and amounts of the polymerization initiator, the chain-transfer agent, the emulsifier, the solvent and the like used in producing the above-mentioned rubber-reinforced vinyl-based resin, further polymerization time, polymerization temperature and the like.

As described above, the rubber-reinforced vinyl-based resin according to the present invention may be a mixture of rubber-reinforced vinyl-based resins [A1] and [A2] prepared independently, or a rubber-reinforced vinyl-based resin [A3] obtained by polymerizing the vinyl-based monomer [b1] in the presence of the diene-based rubbery polymer [a1] and the ethylene·α-olefin-based rubbery polymer [a2]. Therefore, when a plurality of rubber-reinforced vinyl-based resins shown as the former are used, a mixture prepared after isolating in producing may be used as it is, and one obtained by another method including producing latexes containing each of resins by emulsion polymerization, mixing the latexes, conducting solidification and the like, may be used.

Additionally, the above-mentioned polymer [B] can be produced by polymerizing the vinyl-based monomer [b3] in the presence of a polymerization initiator applying solution polymerization, bulk polymerization, emulsion polymerization, suspension polymerization or the like, or thermal polymerization using no polymerization initiators, under publicly known conditions.

The intrinsic viscosity [η] (measured in methylethylketone at a temperature of 30° C.) of the above-mentioned polymer [B] is preferably in a range from 0.2 to 0.8 dl/g and more preferably from 0.3 to 0.6 dl/g. When the intrinsic viscosity [η] is in the above-mentioned range, a physical property balance between moldability and impact resistance is excellent. This intrinsic viscosity [η] can be controlled by adjusting the production condition.

The present composition may comprise other resin, an additive and the like in addition to the above-mentioned rubber-reinforced vinyl-based resin.

The other resin includes a polycarbonate resin, a polyester resin, a polyamide resin and the like. Among these, a polycarbonate resin is preferred.

The polycarbonate resin is not particularly limited so long as it has a carbonate bond in the principal chain.

This polycarbonate resin may be an aromatic polycarbonate or an aliphatic polycarbonate. Further, these may be used in combination. In the present invention, the aromatic polycarbonate is preferred from the aspect of impact resistance and the like. This polycarbonate resin may be one whose terminate is modified by an R-CO-group or an R'-O-CO-group (each of R and R' represents an organic group.).

As the above-mentioned aromatic polycarbonate, one obtained by melting an aromatic dihydroxy compound and a carbonic acid diester to perform ester interchange (transesterification), one obtained by interfacial polymerization method using phosgene, one obtained by pyridine method using a reaction product of pyridine and phosgene, and the like may be used.

The aromatic dihydroxy compound may be one having two hydroxyl groups in the molecule. Examples of the aromatic dihydroxy compound include dihydroxybenzene such as hydroquinone and resorcinol, 4,4'-biphenol, 2,2-bis(4-hydroxyphenyl) propane (hereinafter referred to as "bisphenol A"), 2,2-bis(3,5-dibromo-4-hydroxyphenyl) propane, 2,2-bis(4-hydroxyphenyl-3-methylphenyl) propane, 2,2-bis(3-tert-butyl-4-hydroxyphenyl) propane, 2,2-bis(3,5-dimethyl-4-hydroxyphenyl) propane, bis(4-hydroxyphenyl) methane, 1,1-bis(p-hydroxyphenyl) ethane, 2,2-bis(p-hydroxyphenyl) butane, 2,2-bis(p-hydroxyphenyl) pentane, 1,1-bis(p-hydroxyphenyl) cyclohexane, 1,1-bis(p-hydroxyphenyl)-4-isopropylcyclohexane, 1,1-bis(p-hydroxyphenyl)-3,3,5-trimethylcyclohexane, 1,1-bis(p-hydroxyphenyl)-1-phenylethane, 9,9-bis(p-hydroxyphenyl) fluorene, 9,9-bis(p-hydroxy-3-methylphenyl) fluorene, 4,4'-(p-phenylenediisopropylidene) diphenol, 4,4'-(m-phenylenediisopropylidene) diphenol, bis(p-hydroxyphenyl) oxide, bis(p-hydroxyphenyl) ether, bis(p-hydroxyphenyl) ketone, bis(p-hydroxyphenyl) ester, bis(p-hydroxyphenyl) sulfide, bis(p-hydroxy-3-methylphenyl) sulfide, bis(p-hydroxyphenyl) sulfone, bis(3,5-dibromo-4-hydroxyphenyl) sulfone, bis(p-hydroxyphenyl) sulfoxide and the like. These may be used alone or in combination of two or more.

Among the above-mentioned aromatic dihydroxy compounds, a compound having a hydrocarbon group between two benzene rings is preferred. This hydrocarbon in this compound may be a halogen-substituted hydrocarbon group. In addition, a hydrogen atom in the benzene ring may be replaced with a halogen atom. Therefore, the compound having a hydrocarbon group between two benzene rings includes bisphenol A, 2,2-bis(3,5-dibromo-4-hydroxyphenyl) propane, 2,2-bis(4-hydroxyphenyl-3-methylphenyl) propane, 2,2-bis(3-tert-butyl-4-hydroxyphenyl) propane, 2,2-bis(3,5-dimethyl-4-hydroxyphenyl) propane, bis(4-hydroxyphenyl) methane, 1,1-bis(p-hydroxyphenyl) ethane, 2,2-bis(p-hydroxyphenyl) butane and the like. Among these, bisphenol A is particularly preferred.

The carbonic acid diester used for obtaining the aromatic polycarbonate by transesterification includes dimethyl carbonate, diethyl carbonate, di-tert-butyl carbonate, diphenyl carbonate, ditolyl carbonate and the like. These may be used alone or in combination of two or more.

The viscosity average molecular weight of the above-mentioned polycarbonate resin is preferably in a range from 15,000 to 30,000 and more preferably from 17,000 to 25,000. When the viscosity average molecular weight is in the above-mentioned range, a physical property balance between impact resistance and moldability is excellent.

The above-mentioned polycarbonate resin may be a mixture of two or more polycarbonate resins whose viscosity average molecular weights are different from each other and are out of the preferable range, so long as the viscosity average molecular weight as a whole resides the above range.

In the case the present composition comprises a polycarbonate resin, the content of the above-mentioned polycarbonate resin is preferably in a range from 35 to 90% by mass, more preferably from 40 to 80% by mass and further preferably from 45 to 70% by mass with respect to 100% by mass of the total of the rubber-reinforced vinyl-based resin and the polycarbonate resin. When the content is in the above-mentioned range, a physical property balance between moldability and impact resistance is excellent.

The additive to be formulated into the present composition includes an antioxidant, a thermal stabilizer, an antistatic agent, a plasticizer, a mold-releasing agent, a lubricant, a sliding agent, a coloring agent, a filler, an antibacterial agent, a flame retardant and the like.

The total content of the above-mentioned diene-based rubbery polymer [a1] and the above-mentioned ethylene·α-olefin-based rubbery polymer [a2] is in a range from 3 to 30% by mass, preferably from 4 to 27% by mass and more preferably from 5 to 25% by mass with respect to 100% by mass of the present composition. When the content is in the above-mentioned range, a physical property balance between impact resistance and impact resistance is excellent.

In addition, the ratio of the content of the above-mentioned ethylene·α-olefin-based rubbery polymer [a2] to the total amount of the above-mentioned diene-based rubbery polymer [a1] and the above-mentioned ethylene·α-olefin-based rubbery polymer [a2] is in a range from 0.01 to 0.4, preferably from 0.02 to 0.3 and more preferably 0.05 to 0.25. When the ratio is in the above-mentioned range, a physical property balance between plating performance and appearance of a non-plated portion is excellent.

The present composition can be produced by charging starting components including a rubber-reinforced vinyl-based resin and the like into a variety of extruders, Banbury mixer, a kneader, a roll, a feeder ruder or the like to knead while heating. The method for using starting components is not particularly limited, and kneading may be started after charging all of the starting components or be conducted while charging them dividedly such as multistep charging.

2. Molded Article

The molded article of the present invention comprises the above-mentioned present composition. That is, examples of the present molded article includes (1) a molded article wherein main polymer component is one or more among [i], [ii], [iii] and [iv] exemplified as the above-mentioned rubber-reinforced vinyl-based resin, and (2) a molded article wherein main component is a mixture of one or more among [i], [ii], [iii] and [iv] exemplified as the above-mentioned rubber-reinforced vinyl-based resin and the above-mentioned polycarbonate resin.

The present molded article is suitable for wide application including a part for a vehicle including cars; an electronic part, a housing, a frame, a handle and a support for electric appliances, precision machines and the like; a container and a cover for cosmetics and the like; a building material; a housing, a frame, a handle, a knob and the like for furniture and housing articles, and the like.

The above-mentioned molded article can be produced by processing the present composition or its component to a publicly known molding apparatus such as injection molding apparatus, pressing molding apparatus, calendar molding apparatus, T-die extrusion molding apparatus and contour extrusion apparatus to form.

When the present molded article is subjected to direct plating method, depositibility and growability of a metal such as copper, nickel and chromium or an alloy are excellent, and therefore adherence to the surface of the molded article and appearance are also superior. In particular, it is suitable for forming a copper film.

3. Plated Article

The plated article of the present invention is characterized by comprising a molded part comprising the above-mentioned resin composition for direct plating, and a metal film or an alloy film, which is formed on at least one part of surface of this molded part by direct plating. The thickness of the metal film or the alloy film is usually in a range from 5 to 200 µm and preferably from 5 to 150 µm.

This direct plating method is a method in which a catalytic layer composed of palladium-tin and the like is deposited to the surface of a molded article, a liquid containing a specific reducing agent, copper ion and the like is used to form a conductor layer (or a conductor part), and then, electroplating is directly applied with omitting a conductivity-imparting treatment in electroless plating method, to have a metal such as copper, nickel, and chromium or an alloy deposited on the conductor layer and grow them. The metal film or the alloy film may have a multilayer structure according to purposes, uses or the like. For example, a metal film consisting of copper or nickel is formed, and then a metal film comprising copper, nickel, chromium and the like or an alloy film may be further formed on the surface thereof. For the purpose of forming a metallic film or an alloy film comprising a component other than copper on the outermost surface of a molded article, a method of forming the film comprising the component other than copper after forming a copper film is usually adopted.

When the electroplating carried out after formation of the conductor layer, conventionally and publicly known methods may be applied. In this case, film-forming conditions may be suitably selected in consideration of a material for forming the metal film or the alloy film, thickness and the like.

For example, when copper plating is conducted, an aqueous solution containing a copper ion and a reducing agent is used. A copper compound which generates the copper ion includes copper sulfate, copper chloride, copper nitrate, copper sulfamate and the like. The reducing agent includes sodium boron hydride, hypophosphite, dimethylamine borane, trimethylamine borane, hydrazine and the like. A complexing agent such as polyamine and aminocarboxylic acid may be formulated if necessary.

Since the molded part in which a metal film or an alloy film is to be formed of the present plated article comprises the above-mentioned present composition, adherence between the surface of the molded part and the film comprising a metal or an alloy is excellent and also is appearance of the plated article.

EXAMPLES

The present invention is described in detail hereinafter using examples. The present invention is in no way limited by these examples. In addition, "part" and "%" in the examples are based on mass unless otherwise indicated.

1. Evaluating Method

Measuring method and evaluating method for resin compositions and plated articles are described below. Test pieces used in each item for evaluating were prepared by introducing the resin compositions into an injection molding apparatus ("J100E-C5 type" manufactured by The Japan Steel Works, LTD.) under conditions of a cylinder preset temperature of 200° C. and a die temperature of 50° C. to form in a predetermined shape and size.

1-1. Impact Resistance

It was evaluated with Charpy impact strength according to ISO 179.

1-2. Adherence of Film Plated

Plating on a specimen was conducted by the below way according to "CRP process" by Okuno Chemical Industries Co., Ltd.

The specimen (150 mm in length, 70 mm in width, 3.2 mm in thickness) was immersed in the "CRP CLEANER" of 40° C. for 3 minutes to defat. After that, rinsing with water of 20° C. was carried out and the specimen was immersed in an etchant (chromic acid: 400 g/l, sulfuric acid: 400 g/l) of 67° C. for 10 minutes.

Subsequently, the specimen was subjected to rinsing with water of 20° C. and predipping was carried out by using a 35% hydrochloric acid solution of 35° C. for 1 minute. Then Pd—Sn colloid catalyst treatment by immersing the specimen in the "CRP CATALYST" of 35° C. for 6 minutes was carried out.

After that, the resultant catalyzed specimen was washed with water of 20° C., and conductivity-imparting treatment was conducted by immersing it in "CRP SELECTOR A" and "CRP SELECTOR B" of 45° C. for 3 minutes sequentially. Then, the specimen after conductivity-imparting treatment was washed with water of 20° C., and was subjected to electrolytic copper plating at room temperature for 60 minutes to form a copper film of 40 µm in thickness. Subsequently, this specimen having a copper film was washed with water of 20° C., and dried at 80° C. for 2 hours.

Adherence of the copper film in the above copper-plated specimen was evaluated by measurement of peeling strength as follows. At first, the specimen having a copper film was cut into pieces of 10 mm in width, and then the copper film was peeled from the specimen at an angle of 90 degrees to measure the strength (peeling strength). Criteria for judging are as follows.

○: 0.8 kN/m or more.
Δ: 0.4 kN/m or more and less than 0.8 kN/m.
X: less than 0.4 kN/m.

Preferable peeling strength is 0.8 kN/m or more for vehicle uses, and 0.4 kN/m or more for general uses.

1-3. Depositivity of Metal

A copper-plated specimen was produced by the same manner as the process of the above 1-2, except that a spiral flow-type molded article (20 mm in width, 2 mm in thickness) was used as a specimen to be plated and electrolytic copper plating was carried out at room temperature for 10 minutes. Copper plated length on the test piece after 10 minutes-plating was measured. The depositivity of a metal becomes more excellent as this plated length is longer. Criteria for judgment are as follows.

⊚: 50 mm or more.
○: 30 mm or more and less than 50 mm.
Δ: 10 mm or more and less than 30 mm.
X: less than 10 mm.

1-4. Appearance

A copper film on the surface of the spiral flow-shaped molded article obtained in the above 1-3 was visual observed. Criteria for judgment are as follows.

○: Non-plated portion was not observed and copper film was uniform.
Δ: Intermediate between ○ and X.
X: Non-plated portion was observed and copper film was uneven.

2. Components to be Formulated for Thermoplastic Resin Composition 2-1. Rubber-reinforced Vinyl-based Resin (ABS)

A resin obtained by the following method was used.

Into a glass flask having an inner volume of 7 liters and equipped with an agitator, 75 parts of ion exchange water, 0.5 part of potassium rosinate, 0.1 part of tert-dodecyl mercaptan, 39 parts (solid content) of polybutadiene rubber latex (number average particle diameter: 3,500 angstroms, gel content: 85%), 15 parts of styrene and 5 parts of acrylonitrile were charged, in a nitrogen gas stream, and temperature was raised while agitating. When an internal temperature reached 45° C., a solution containing 0.2 part of sodium pyrophosphate, 0.01 part of ferrous sulfate heptahydrate, and 0.2 part of glucose which were dissolved in 20 parts of ion exchange water was added, and the mixture was further agitated. Then, 0.07 part of cumene hydroperoxide was added to start polymerization.

After polymerizing for 1 hour, 50 parts of ion exchange water, 0.7 part of potassium rosinate, 31 parts of styrene, 10 parts of acrylonitrile, 0.05 part of tert-dodecyl mercaptan and 0.01 part of cumene hydroperoxide were further added continuously over 3 hours.

The polymerization was continued for 1 hour, and then 0.2 part of 2,2'-methylene-bis(4-ethyl-6-tert-butylphenol) was added to complete the reaction. The polymerization conversion rate was 98%. Subsequently, a resin component was solidified from a latex which was a reaction product with an aqueous solution of sulfuric acid, rinsed and dried to obtain "ABS".

The resultant ABS had polybutadiene rubber (PBD) content of 40%, graft ratio of 68% and intrinsic viscosity [η] (measured at 30° C. in methylethylketone) of a component dissolved by acetone of 0.45 dl/g.

2-2. Rubber-reinforced Vinyl-based Resin (AES)

A resin obtained by the following method was used.

Into a stainless steel autoclave having an internal volume of 20 liters and equipped with a ribbon type impeller, an auxiliary agent continuous addition apparatus and a thermometer, 19 parts of ethylene•propylene-based rubber (tradename "EP84", manufactured by JSR Corp.), 57 parts of styrene, 24 parts of acrylonitrile and 110 parts of toluene were charged, and temperature was raised while agitating. When the internal temperature reached 75° C., the agitation was further continued for 1 hour. Then, 0.45 part of tert-butylperoxyisopropyl was added, and temperature was raised while agitating the mixture. When an internal temperature reached 100° C., a polymerization reaction was carried out at an agitating revolution speed of 100 rpm.

After polymerizing for 4 hours, the internal temperature was raised to 120° C., and the reaction was further continued for 2 hours and then halted. The polymerization conversion rate was 95%.

Subsequently, the internal temperature was cooled to 100° C., and added 0.2 part of octadecyl-3-(3,5-di-tert-butyl-4-hydroxyphenol)-propionate. After that, the reaction mixture was discharged from the autoclave, and steam distillation was carried out to eliminate unreacted materials and a solvent. Finally "AES" was obtained by drying.

The resultant AES had ethylene•propylene-based rubber (EPR) content of 20%, graft ratio of 55% and intrinsic viscosity [η] (measured at 30° C. in methylethylketone) of a content dissolved by acetone of 0.35 dl/g.

2-3. Acrylonitrile•Styrene copolymer (AS)

Copolymer which is consisting of styrene unit in an amount of 73% and acrylonitrile unit in an amount of 27% was used. The intrinsic viscosity [η] (measured in methylethylketone at a temperature of 30° C.) is 0.6 dl/g.

2-4. Polycarbonate Resin (PC)

"NOVAREX 7022PJ" (trade name) manufactured by Mitsubishi Engineering-Plastics Corporation was used. The viscosity average molecular weight is 22,000.

2-5. Rubber-reinforced Vinyl-based Resin (ASA)

A resin obtained by the following method was used.

Into a reactor, 19 parts (solid content) of acrylic rubber latex (a copolymer of 99% n-butyl acrylate unit and 1% allyl methacrylate unit, weight average particle diameter: 2,900 angstroms) obtained by emulsion polymerization, and 100 parts of water (including the water of latex) were charged, in a nitrogen gas stream, and temperature was raised while agitating. When an internal temperature reached 40° C., an aqueous solution consisting of 0.3 part of glucose, 1.2 part of sodium pyrophosphate, 0.01 part of ferrous sulfate and 20 parts of water, and an aqueous solution consisting of 0.12 part of tert-butyl hydroperoxide, 0.72 part of disproportionating potassium rosinate and 9 parts of water were added.

Subsequently, temperature was raised while agitating, and when the internal temperature reached 75° C., polymerization was carried out while maintaining this temperature and continuously adding a mixture comprising 59 parts of styrene, 22 parts of acrylonitrile and 2.8 parts of tert-butylhydroperoxide over 4 hours.

After the reaction, the polymerization conversion rate was measured and it was 95%. A resin component was solidified from a latex which was a reaction product with an aqueous solution of sulfuric acid, rinsed and dried to obtain "ASA".

The resultant ASA had the acrylic rubber (AR) content of 20%, graft ratio of 70% and intrinsic viscosity [η] (measured at 30° C. in methylethylketone) of a component dissolved by acetonitrile of 0.5 dl/g.

3. Production and Evaluation of Resin Composition for Direct Plating

Examples 1 to 8 and Comparative Examples 1 to 5

A specified amount of each component described in Tables 1 and 2 was mixed with a Henschel mixer for 3 minutes. Then, a φ40 mm extruder (cylinder preset temperature 200° C.) was used to melt and knead and a pelletized resin composition for direct plating was obtained.

Each of resin compositions was subjected to measurement and evaluation described above. The results are shown in Tables 1 and 2.

TABLE 1

|  |  |  | Example | | | | | | | | |
|---|---|---|---|---|---|---|---|---|---|---|---|
|  |  |  | 1 | 2 | 3 | 4 | 5 | 6 | 7 | 8 |
| Resin composition | Amount (part) | ABS (PBD content 40%) | 42.5 | 45 | 40 | 30 | 55 | 35 | 32 | 40 |
|  |  | AES (EPR content 20%) | 15 | 10 | 20 | 15 | 15 | 15 | 8 | 20 |
|  |  | AS | 42.5 | 45 | 40 | 55 | 30 |  |  |  |
|  |  | PC |  |  |  |  |  | 50 | 60 | 40 |
|  | Property | Content ratio of the total content of PBD and EPR (%) | 20 | 20 | 20 | 15 | 25 | 17 | 14.4 | 20 |
|  |  | EPR/(PBD + EPR) | 0.15 | 0.10 | 0.20 | 0.20 | 0.12 | 0.18 | 0.11 | 0.20 |
| Evaluation result | Depositivity of plating |  | ◎ | ◎ | ◎ | ◎ | ◎ | ◎ | ◎ | ◎ |
|  | Appearance |  | ○ | ○ | ○ | ○ | ○ | ○ | ○ | ○ |
|  | Adherence |  | ○ | ○ | ○ | ○ | ○ | ○ | ○ | ○ |
|  | Charpy impact strength (kJ/m$^2$) |  | 28 | 30 | 26 | 16 | 47 | 62 | 53 | 44 |

TABLE 2

|  |  |  | Comparative example | | | | |
|---|---|---|---|---|---|---|---|
|  |  |  | 1 | 2 | 3 | 4 | 5 |
| Resin composition | Amount (part) | ABS (PBD content 40%) | 50 | 25 | 42.5 | 15 | 40 |
|  |  | AES (EPR content 20%) |  | 50 |  | 35 |  |
|  |  | AS | 50 | 25 | 42.5 |  |  |
|  |  | ASA (AR content 20%) |  |  | 15 |  |  |
|  |  | PC |  |  |  | 50 | 60 |
|  | Property | Content ratio of the total content of PBD and EPR (%) | 20 | 20 | 20 | 13 | 16 |
|  |  | EPR/(PBD + EPR) | 0 | 0.50 | 0 | 0.54 | 0 |
| Evaluation result | Depositivity of plating |  | Δ | ◎ | Δ | ◎ | X |
|  | Appearance |  | ○ | X | X | ○ | — |
|  | Adherence |  | ○ | Δ | Δ | X | — |
|  | Charpy impact strength (kJ/m$^2$) |  | 32 | 27 | 22 | 34 | 42 |

4. Results

The following is clear based on the results shown in Tables 1 and 2.

Comparative example 1 was one in which ethylene•α-olefin-based rubbery polymer (EPR) was not contained and depositibility was deteriorated. Comparative example 2 was one where ratio of content of the ethylene•α-olefin-based rubbery polymer (EPR) to total of the diene-based rubbery polymer (PBD) and the ethylene•α-olefin-based rubbery polymer (EPR) was as high as 0.50, depositibility was better but appearance and adherence were deteriorated. Comparative example was one where ASA was used instead of AES, depositibility, appearance and adherence were deteriorated. Regarding Comparative examples 4 and 5 in which a rubber-reinforced vinyl-based resin and a polycarbonate resin were combined, Comparative example 4 was one where ratio of EPR content to the total of PBD and EPR was as high as 0.54, depositibility and appearance were better but adherence was deteriorated. Further, Comparative example 5 was one in which AES was not contained, depositibility and adherence were deteriorated.

On the other hand, Examples 1 to 8 were excellent in depositibility, appearance and adherence.

INDUSTRIAL APPLICABILITY

The resin composition for direct plating of the present invention is suitable as a part for a vehicle including cars; an electronic part, a housing, a frame, a handle and a support for electric appliances, precision machines and the like; a container and a cover for cosmetics and the like; a building material; a housing, a frame, a handle, a knob and the like for furniture and housing articles, and the like.

The invention claimed is:

1. A resin composition for direct plating, which is a thermoplastic resin composition consisting of a polycarbonate resin, an antioxidant, and a component of mixture (1) or mixture (2):

mixture (1): a mixture consisting of a rubber-reinforced vinyl-based resin [A1] obtained by polymerizing a vinyl-based monomer [b1] in the presence of a diene-based rubbery polymer [a1], wherein the vinyl-based monomer [b1] consists of an aromatic vinyl compound and a cyanidated vinyl compound, and the diene-based rubbery polymer [a1] is selected from the group consisting of a polybutadiene homopolymer, a polyisoprene homopolymer, a styrene•butadiene copolymer, a styrene•butadiene•styrene copolymer, a styrene•isoprene copolymer, a styrene•isoprene•styrene copolymer, and combinations thereof, and a rubber-reinforced vinyl based resin [A2] obtained by polymerizing a vinyl-based monomer [b2] in the presence of an ethylene•α-olefin-based rubbery polymer [a2] wherein the vinyl-based monomer [b2] consists of an aromatic vinyl compound and a cyanidated vinyl compound, and the ethylene •α-olefin-based rubbery polymer [a2] is selected from the group consisting of a ethylene-propylene copolymer, an ethylene•butene-1copolymer, an ethylene•α-olefin•non-conjugated diene copolymer, an ethylene-propylene•5-ethylidene-2-norbornene copolymer, an ethylene•butene•5-ethylidene-2-norbornene copolymer, and combinations thereof, mixture (2): a mixture consisting of said rubber-reinforced vinyl-based resin [A1], said rubber-reinforced vinyl based resin [A2] and a (co)polymer of a vinyl-based monomer [b3] consisting of an aromatic vinyl compound and a cyanidated vinyl compound, wherein the total amount of said diene-based rubbery polymer [a1] and said ethylene•α-olefin-based rubbery polymer [a2] is in a range from 3 to 30% by mass based on said thermoplastic resin composition, and wherein the ratio of said ethylene•α-olefin-based rubbery polymer [a2] to said total amount of the diene-based rubbery polymer [a1] and the ethylene•α-olefin-based rubbery polymer [a2] is in a range from 0.01 to 0.25, wherein the vinyl-based monomers [b1], [b2] and [b3] do not contain (meth)acrylic ester monomer units, wherein the rubber-reinforced vinyl-based resin [A1] consists of polymerized units of the vinyl-based monomer [b1] and the diene-based rubbery polymer [a1], and the rubber-reinforced vinyl-based resin [A2] consists of polymerized units of the vinyl-based monomer [b2] and the ethylene•α-olefin-based rubbery polymer [a2].

2. The resin composition for direct plating according to claim 1, wherein said polycarbonate resin is present in an amount of from 35 to 90% by mass with respect to 100% by mass of the total of said polycarbonate and said rubber-reinforced vinyl-based resin.

3. A molded article being characterized by comprising said resin composition for direct plating according to claim 1.

4. The molded article according to claim 3, wherein the content of said polycarbonate resin is in a range from 35 to 90% by mass with respect to 100% by mass of the total of said polycarbonate and said rubber-reinforced vinyl-based resin.

5. A plated article being characterized by comprising a molded part comprising said resin composition for direct plating according to claim 1, and a film comprising a metal or an alloy, which is formed on at least one part of the surface of said molded part by direct plating.

6. A process for producing a plated article, comprising:
    producing a molded article comprising said resin composition for direct plating according to claim 1, and;
    forming a film comprising a metal or an alloy on at least one part of the surface of said molded article by direct plating.

7. The resin composition of claim 1, wherein the rubber-reinforced vinyl-based resin [A1] is acrylonitrile-butadiene-styrene and the rubber-reinforced vinyl-based resin [A2] is acrylonitrile-ethylene-propylene-styrene.

8. The resin composition of claim 1,
    wherein the component is the mixture (1).

* * * * *